United States Patent [19]

Hamm, Jr.

[11] Patent Number: 5,215,335
[45] Date of Patent: Jun. 1, 1993

[54] FITTING FOR PRESSURIZED FLUID LINES AND METHOD FOR MAKING SAME

[75] Inventor: Ronald J. Hamm, Jr., Marshall, Mich.

[73] Assignee: Air-Way Manufacturing Company, Olivet, Mich.

[21] Appl. No.: 750,250

[22] Filed: Aug. 26, 1991

[51] Int. Cl.$^5$ .................. F16L 33/00; F16L 15/00
[52] U.S. Cl. ..................... 285/39; 285/179; 285/238; 248/68.1; 29/890.148
[58] Field of Search .............. 248/68.1, 74.4; 285/39, 285/38, 155, 136, 238, 239, 173, 174, 53, 179; 29/890.148

[56] References Cited

U.S. PATENT DOCUMENTS

| | | | |
|---|---|---|---|
| 1,035,212 | 8/1912 | McCarthy | 285/53 |
| 1,881,913 | 10/1932 | Parker | |
| 2,257,427 | 9/1941 | Parker | 29/890.148 |
| 2,309,666 | 2/1943 | Parker | 29/890.148 |
| 2,460,622 | 2/1949 | Crawley | 29/890.148 |
| 2,872,963 | 2/1959 | Boyer | |
| 3,179,443 | 4/1965 | Staffel | 285/238 |
| 3,414,220 | 12/1968 | Walker | |
| 3,702,707 | 11/1972 | Rosan, Sr. | |
| 3,843,169 | 10/1974 | Wise | 285/39 |
| 3,871,687 | 3/1975 | Docknee | 285/292 |
| 3,936,078 | 2/1976 | Wallyn | 285/292 |
| 4,009,896 | 3/1977 | Brewer | |
| 4,093,280 | 6/1978 | Yoshizawa et al. | |
| 4,288,103 | 9/1981 | Gallagher | 285/179 |
| 4,602,807 | 7/1986 | Bowers | |
| 4,712,809 | 12/1987 | Legris | 285/239 |
| 4,848,802 | 7/1989 | Wolf et al. | |
| 4,854,613 | 8/1989 | Reece et al. | |
| 4,878,696 | 11/1989 | Walker | |
| 5,098,047 | 3/1992 | Plumley | 248/68.1 |

FOREIGN PATENT DOCUMENTS

| | | | |
|---|---|---|---|
| 580160 | 7/1959 | Canada | 285/179 |
| 810096 | 3/1937 | France | 285/239 |
| 2288930 | 5/1976 | France | 285/239 |

OTHER PUBLICATIONS

Hydraulic Fittings, Bulletin #105-78, Air-Way Manufacturing.

Primary Examiner—Eric K. Nicholson
Attorney, Agent, or Firm—Reising, Ethington, Barnard, Perry & Milton

[57] ABSTRACT

A hydraulic fitting (20,120,220,320,420,520,620,720,820) [of the type for connecting pressurized fluid-conveying members includes a tubular member (22,122,222,322,422,522,622,722,822) having opposite distal ends and defining a fluid passage (24,124,224,324,424,524,624,724,824) extending between the ends of the tubular member (22,122,222,322,422,522,622,722,822).] includes [T]threaded connection portions (26,126,226,326,426,526,626,726,826) [are provided on each end of the tubular member (22,122,222,322,422,522,622,722,822) for connecting the fitting (20,120,220,320,420,520,620,720,820) with hydraulic fluid lines and the like.], and [S]sealing portions (28,128,228,328,428,528,628,728,828) [are formed] adjacent the connecting portions (26,126,226,326,426,526,626,726,826) for perfecting a fluid-tight seal between the fitting (20,120,220,320,420,520,620,720,820) and [the] associated fluid lines. A central body member (34,134,234,334,434,534,634,734,834) is disposed about the tubular member (22,122,222,322,422,522,622,722,822) and presents one or more pairs of flats (36,136,236,336,436,536,636,736,836). The tubular member (22,122,22,322,422,522,622,722,822) and connecting portions (26,126,226,326,426,526,626,726,826) are formed from a single piece of round metal bar stock, whereas the body member (34,134,234,334,434,534,634,734,834) is formed from a molded plastic material. A method is also provided for making the fitting (20,120,220,320,420,520,620,720,820).

41 Claims, 4 Drawing Sheets

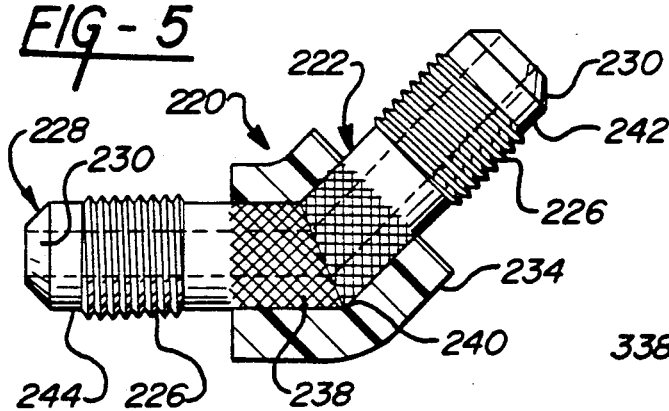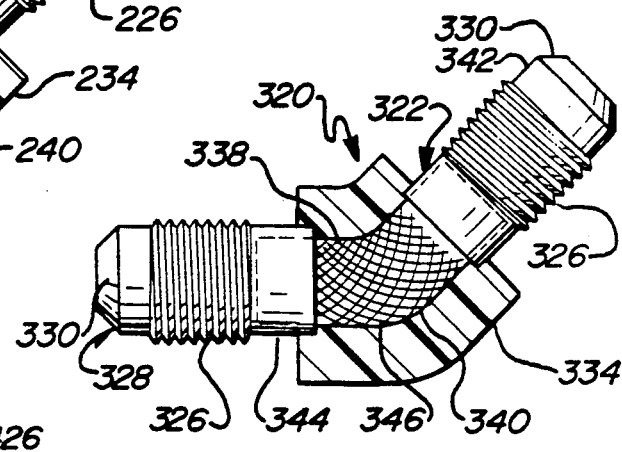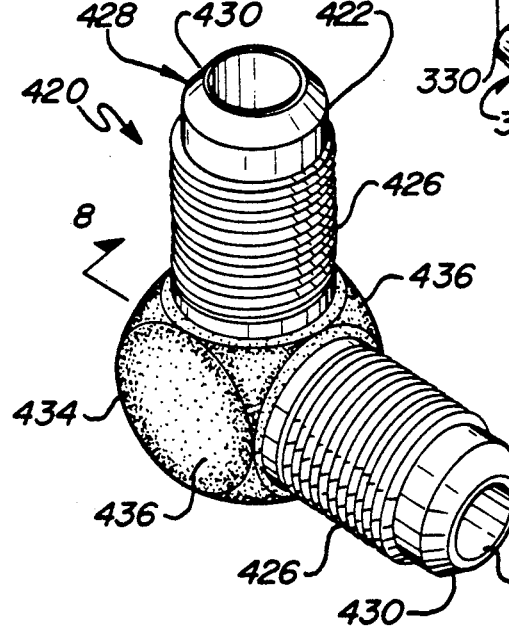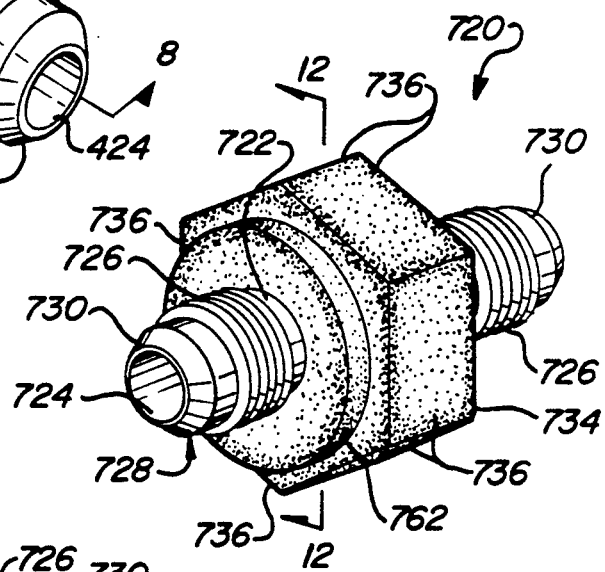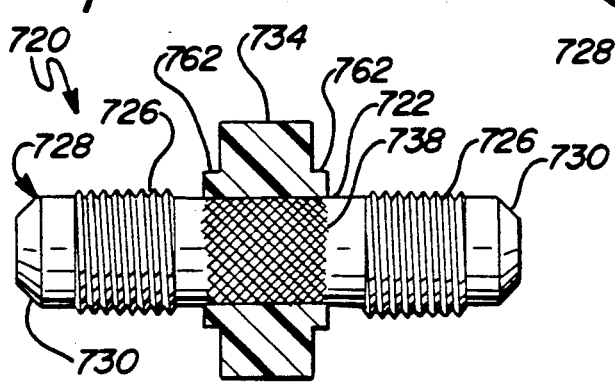

FITTING FOR PRESSURIZED FLUID LINES AND METHOD FOR MAKING SAME

BACKGROUND OF THE INVENTION

1. Field of the Invention

The present invention relates to fittings of the type used for interconnecting hydraulic, pneumatic, and other high pressure fluid lines and their associated hardware.

2. Description of the Prior Art

Fittings are often used when it is necessary to connect pressurized fluid lines with one another and/or with associated hardware, such as actuators, manifolds, and the like. Fittings of this type typically include a tubular member defining a fluid passage, threaded connection portions on the ends of the tubular member for connecting the fitting with associated fluid lines, sealing portions adjacent the ends for perfecting a fluid-tight seal between the fitting and the associated fluid lines, and a central body portion formed radially larger than the tubular member and presenting at least one pair of diametrically opposed flats for engaging a wrench when connecting the fitting with the fluid lines or for mounting within brackets of a standard fluid line clamping system for preventing rotation of the fitting within the brackets.

A fitting used in such applications must have sufficient structural integrity to provide a leak-proof connection under high pressures. Thus, such fittings are commonly fabricated from any of a number of well-known metallic materials such as aluminum, steel, brass, etc. Examples of such fittings are those shown in Air-Way Manufacturing Company's Bulletin Number 105-78 of Olivet, Mich. Other examples include those disclosed in U.S. Pat. Nos. 3,414,220 granted Dec. 3, 1968 and 4,878,696 granted Nov. 7, 1989, both to Walker.

With all of these prior art fittings, the entire fitting is fabricated from metal, including the enlarged body portion. The body portion is either machined from bar stock and then brazed to the tubular member or, when possible, machined integrally with the tubular member. Examples of each are shown in the aforementioned Air-Way Bulletin. When forming the tubular member and body portion as one piece, it is common practice to begin with a piece of bar stock having a size and shape of the body portion. The one-piece fittings referenced above are made from hexagonal bar stock. The bar stock is then machined to form the radially smaller tubular member and threaded connection portions of the fitting. Examples of such fittings include numbers 070201, and 070119 shown in the aforementioned Air-Way Bulletin. Another example of this one-piece fitting for use with a standard plural line clamping system is shown in the previously cited Walker U.S. Pat. No. 4,878,696.

Although certain benefits are realized by machining the body portion and tubular member as one piece rather than forming the body separately from the tubular member and then brazing them together, (e.g., there are no weld joints which are prone to leaking), this type of fitting is still deficient in that a large amount of material is wasted by machining the radially smaller tubular member and threaded connection portions of the fitting from the oversized bar stock or forgings.

U.S. Pat. No. 4,854,613 to Reece et al, granted Aug. 8, 1989 discloses a plastic fitting having a metal internal liner. Although there is less wasted metal with this type of fitting over the above-described prior art fittings, this fitting is deficient in that the threaded connection portions are made from the plastic material which may be unsuitable for some high pressure applications.

SUMMARY OF THE INVENTION AND ADVANTAGES

A fitting of the type for providing a fluid-tight connection between pressurized fluid conveying members comprises a tubular member having opposite distal ends and defining a fluid passage extending between the ends, threaded connection means adjacent each end of the tubular member for threadably connecting the fitting with associated pressurized fluid conveying members, sealing means adjacent the connection means for perfecting a fluid-tight seal between the fitting and the associated pressurized fluid conveying members, and a body member formed radially larger than the connection means and tubular member and fixedly disposed thereabout. The invention is characterized by the tubular member and connection means being fabricated from a first metal material and the body portion being formed separately from the tubular member from a second moldable material different from the first material.

A method is also provided for making a fitting for high pressure fluid line applications. The method includes forming a tubular member out of a first metal material having opposite distal ends and forming a fluid passage within the tubular member extending between the ends thereof. Threaded connection portions are formed of the same first metal material on the ends of the tubular member for providing a threaded connection with associated high-pressure fluid conveying members. Sealing portions are formed adjacent the ends of the tubular member for providing a fluid-tight seal between the fitting and the associated high pressure fluid conveying members. A body member is formed radially larger than the tubular member and connection portions out of a second moldable material different than the first metal material and is fixedly disposed about the tubular member.

The subject fitting has many advantages over the prior art fittings. Firstly, the subject fitting accounts for the tremendous amount of waste associated with forming the prior art one-piece type fittings. The subject fitting significantly reduces material waste by forming the radially larger body portion as a separate molded member rather than as an integral structure of the fitting. Thus, initially smaller size bar stock may be used to form the tubular member and connection portions as compared with the oversized bar stock material used with the prior art fittings.

Another advantage of the subject fitting is that the body portion can be molded from a lightweight material such as plastics to produce a relatively lighter weight fitting.

Yet another advantage of the subject invention is that the configuration of the body portion is not limited to the size and shapes of commercially available bar stock as with the prior art one-piece fittings. The molded body portion can be of whatever size and shape as required by the specific application.

Still another advantage of the subject fitting is that it is less expensive to produce. The lower cost can be attributed to less waste, less machining time and the use of less costly materials.

FIGURES IN THE DRAWINGS

Other advantages of the present invention will be readily appreciated as the same becomes better understood by reference to the following detailed description when considered in connection with the accompanying drawings wherein:

FIG. 5 is a cross-sectional view of another 45 degree fitting constructed in accordance with the present invention;

FIG. 6 is a cross-sectional view of still another 45 degree fitting constructed in accordance with the present invention;

FIG. 7 is a perspective view of a 90 degree fitting constructed in accordance with the present invention;

FIG. 11 is a perspective view of another embodiment of a fitting constructed in accordance with the present invention;

FIG. 12 is a cross-sectional view taken along lines 12—12 of FIG. 8;

DETAILED DESCRIPTION OF THE DRAWINGS

The subject invention generally relates to fittings of the type for connecting two or more fluid lines together or for connecting fluid lines with its associated hardware, such as actuators, manifolds, and the like. These fittings are particularly suitable as hydraulic fittings for machine tools and the like but may be equally suitable for other high pressure fluid applications.

Figure 1:
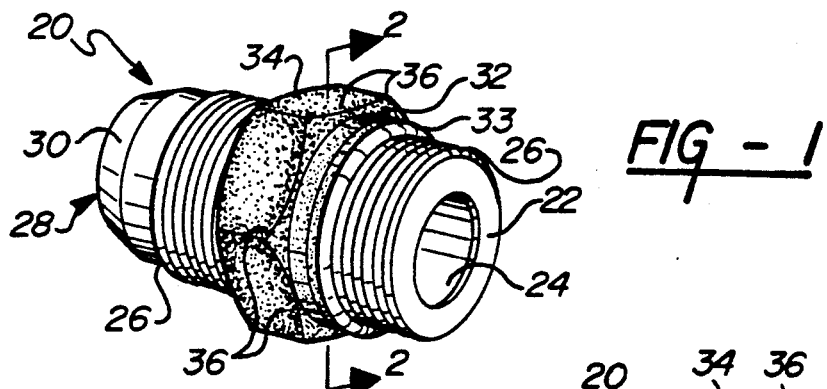
FIG. 1 is a perspective view showing a first embodiment of a fitting constructed in accordance with the present invention.
Figure 2:
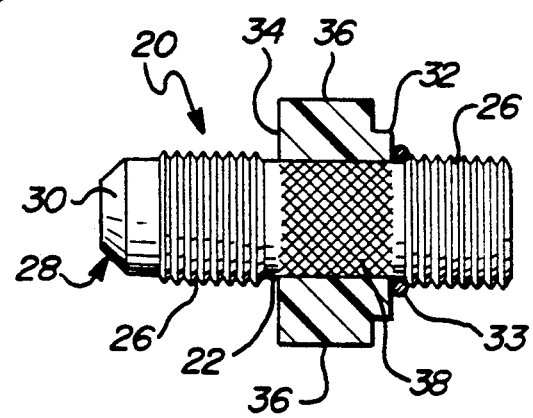
FIG. 2 is a cross-sectional view taken along lines 2—2 of FIG. 1.

Turning now to the enclosed figures, a first embodiment of a fitting constructed in accordance with the present invention is generally shown at 20 in FIGS. 1 and 2. The fitting 20 comprises a tubular member 22 having opposite distal ends and defining a fluid passage 24 extending between the ends of the tubular member 22. The tubular member 22 of FIGS. 1 and 2 is constructed from a single, continuous piece of round metal bar stock (i.e., bar stock having a circular cross-section). In the alternative, a forged piece of stock could be used. The particular type of metal selected will depend on the specific application, but may include such metals as brass, steel, aluminum, and the like. The fluid passage 24 is preferably bored into the fitting 22 by a conventional machining operation.

Each end of the tubular member 22 is formed with threaded connection means 26 for threadably connecting the fitting 20 with associated pressurized fluid conveying members (not shown), including high pressure fluid lines and associated hardware such as manifolds, actuators and the like. The threaded connection means 26 are preferably threaded connection portions or regions 26 (i.e., screw threads) machined integrally on the exterior surface of the tubular member 22 near or at each end of the fitting 20 out of the same piece of round bar stock material. If the screw threads 26 are to be external male threads 26 as shown, the bar stock selected should be large enough to accommodate these threads 26. The threads 26 could also be of the internal female type (not shown).

The fitting 20 further includes sealing means 28 formed adjacent the connection means 26 for perfecting a fluid-tight seal between the fitting 20 and the associated pressurized fluid conveying members (not shown). The sealing means 28 may comprise a 37 degree or 45 degree flare or conical surface 30 formed on one or both ends of a fitting 20. This is shown to the left of FIGS. 1 and 2. Alternatively, a male O-ring type seal may be used. The O-ring seal is formed as a flat, perpendicular O-ring seat or surface 32 on the fitting 20 as shown to the right of FIGS. 1 and 2. An O-ring 33 is disposed about the tubular member 22 adjacent the O-ring seat 32 for perfecting a fluid-tight seal between the fitting 20 and its associated pressurized fluid conveying members (not shown).

Other end fitting configurations and combinations thereof known to the industry are also contemplated such as those illustrated in the Air-Way Manufacturing Co. Bulletin #105-78, and the ones described are just exemplary.

The fitting 20 further includes a body member or portion 34 formed radially larger than the tubular member 22 and threaded connection portions 26 and fixedly disposed about the tubular member 22. The body member 34 defines tool engaging surfaces 36 for engaging a wrench or other support during installation of the fitting 22. The body member 34 of FIGS. 1 and 2 has a hexagonal cross-section and presents three sets of diametrically opposed flats 36 as the tool engaging surfaces 36. These flats 36 are adapted for engaging a wrench or similar device when connecting the fitting 20 with the associated fluid lines. The body member may take on any of a number of different shapes suitable for a particular application.

The body member 34 is formed separate from the tubular member 22 and of a second different material than the tubular member 22. More specifically, the body member 34 is formed of a rigid moldable plastic material and is molded about the tubular member 22 to define a distinct portion of the fitting 20 fixedly joined to the tubular member 22. The plastic material could include polymers, resins, or similar materials which could withstand the forces applied to the body member 22 by the wrench during installation and servicing of the fitting 20.

As can be seen best in FIG. 2, the O-ring seat 32 may also be molded integrally with the body member 34 out of the same material.

The fitting 20 also includes mechanical bonding means 38 formed integrally on the outer surface of the tubular member 20 for mechanically bonding with the body member 34 upon molding the same about the tubular member 20. The mechanical bonding means 38 comprises a gripping surface in the form of a knurled surface 38 formed on the outer surface of the tubular member 22 intermediate the ends thereof. The knurled surface 38 presents a pattern of crisscrossing grooves and ridges which mechanically interlock with the molded body member 34 to prevent relative axial and rotational movement between the body member 34 and the tubular member 22.

Figure 3:
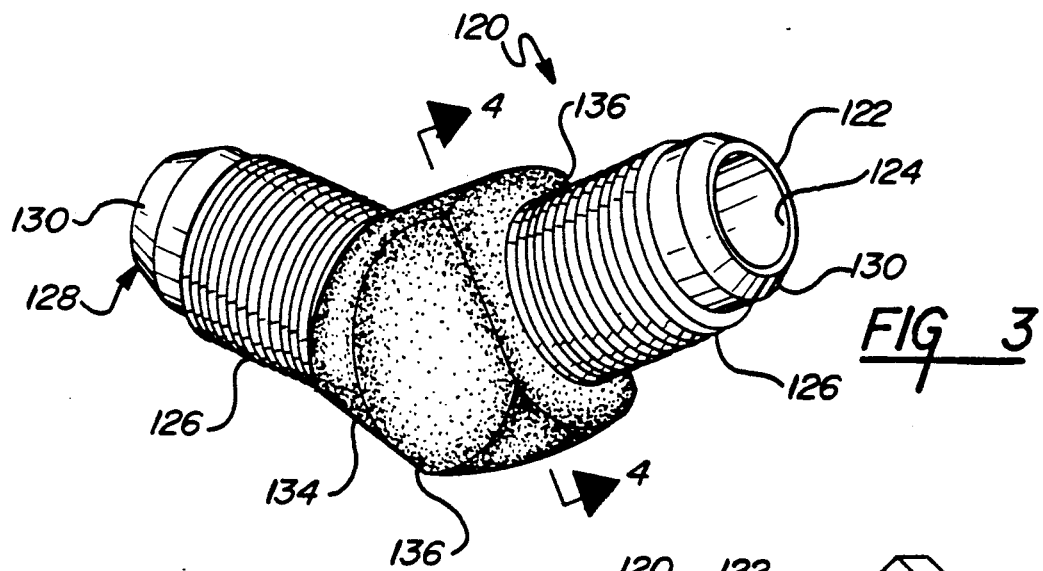
FIG. 3 is a 45 degree fitting constructed in accordance with the present invention.
Figure 4:
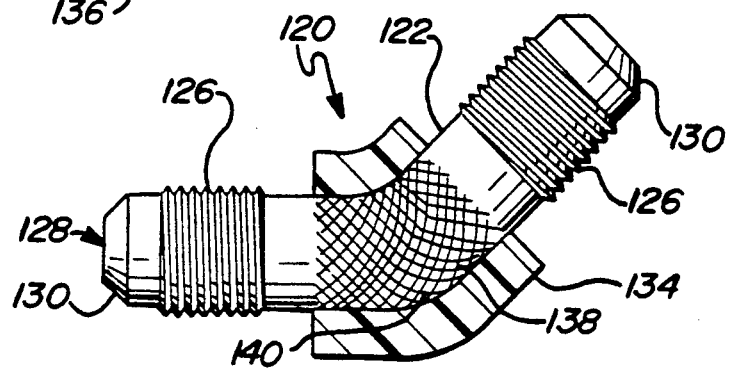
FIG. 4 is a cross-sectional view taken along lines 4—4 of FIG. 3.

Turning now to FIGS. 3 and 4, a second embodiment of a fitting constructed in accordance with the present invention is generally shown at 120, wherein like numerals are used to represent like parts, but are offset by increments of 100 throughout the Figures to distinguish the various embodiments of the present invention. The materials used for the tubular member, connection portion and body member for each of the various embodiments to be described below are preferably the same as those used in the first embodiment of FIGS. 1 and 2 described above.

The fitting 120 is identical to the fitting 20 of the first embodiment except that it is bent so that a 45 degree elbow 140 is formed intermediate the ends of the tubular member 122. That is, the tubular member 122 of FIGS. 3 and 4 is bent or angled 45° away from its central axis so that a 135° angle is formed between the tube ends. Fittings having this angular relationship are commonly referred to in the industry as "45° fitting", as exemplified by the identification of such fitting types in the above-mentioned Air-way Bulletin #105-78. Bending the tubular member 122 preferably takes place prior to molding the body member 134 about the tubular member 122. In fact, the body member 134 is molded about the elbow 140 and is itself shaped with an elbow to conform with the tubular member 122. This one-piece 45 degree fitting 120 provides a smooth, uninterrupted fluid passage 124 within the fitting 120.

Two alternative 45 degree elbow fittings are illustrated in FIG. 5 and 6. The fitting 220 of FIG. 5 comprises a two-piece tubular member 222 having first 242 and second 244 leg sections formed of round metal bar stock and directly joined to one another to form the 45 degree elbow 240. To form the elbow 240, the adjoining ends of the leg sections 242,244 are each cut at a 22.5 degree angle and then joined together (such as by brazing) to create the desired 45 degree elbow 240. The threaded connection portions 226 and flared sealing portions 228 are preferably formed on the individual leg sections 242,244 prior to joining the leg sections 242,244 together. The body member 234 is molded about the elbow 240 in the same manner as with the previously described 45 degree fitting 120.

The fitting 320 of FIG. 6 comprises a three-piece 45 degree tubular member 322 having first and second leg sections 342,344 formed of round metal bar stock and joined together by a separate third elbow piece 346. With this type of fitting 320, the leg sections 342,344 are first formed with the threaded connection portions 326 and flared sealing portions 328 and then joined to the separate and distinct elbow piece 346 which is bent or curved 45 degree to establish the desired 45 degree elbow 340 in the fitting 320. The leg sections 342,344 and elbow piece 346 may be welded or brazed together in the same manner as the leg sections 242,244 of the two-piece 45 degree fitting 220 of FIG. 5. Once the leg sections 342,344 and elbow piece 346 are joined, the body member 334 is molded about the elbow 340 in the same manner as previously described.

Figure 8:
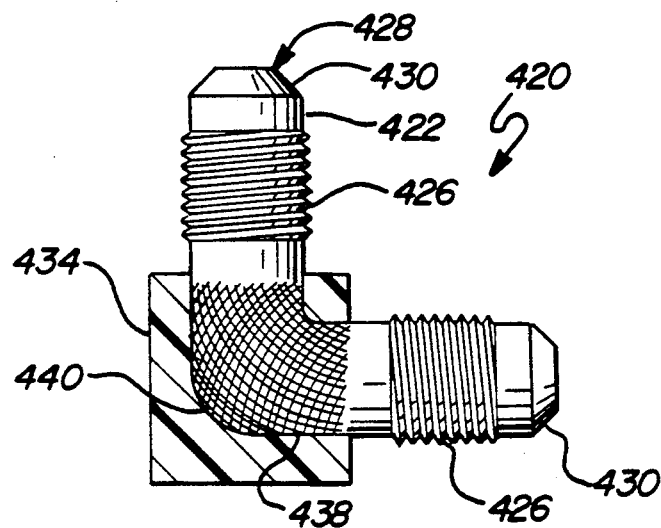
FIG. 8 is a cross-sectional view taken along lines 8—8 of FIG. 7.
Figure 9:
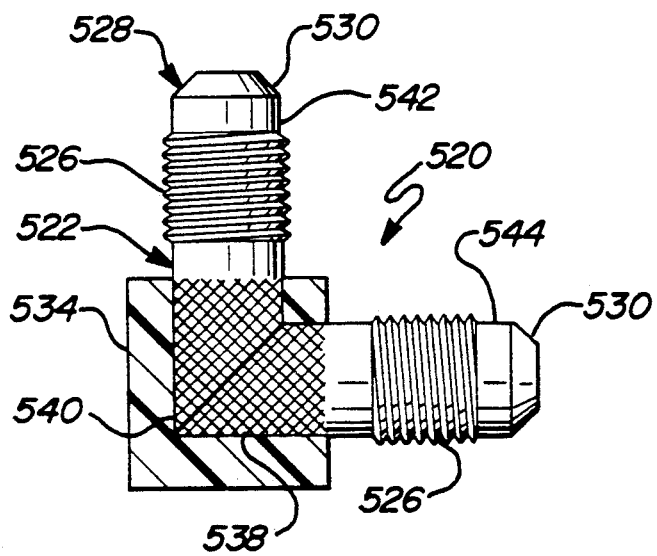
FIG. 9 is another 90 degree fitting constructed in accordance with the present invention.
Figure 10:
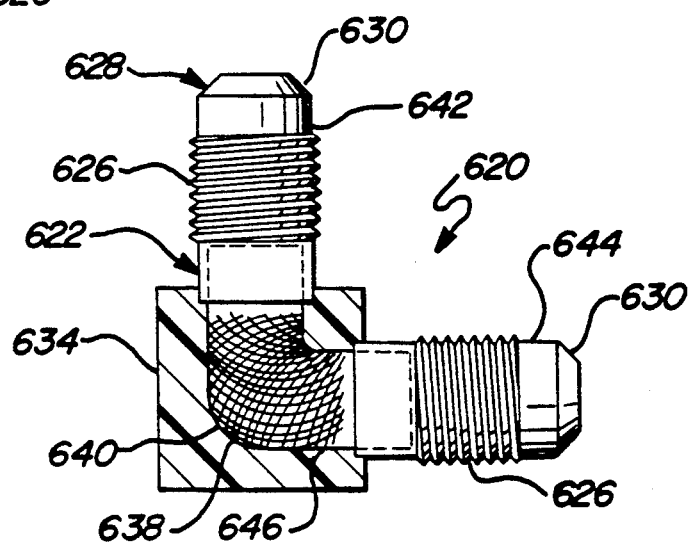
FIG. 10 is a cross-sectional view of yet another 90 degree fitting constructed in accordance with the present invention.

FIGS. 7 through 10 show three additional embodiments of fittings 420,520,620 constructed in accordance with the present invention. These fittings 420,520,620 are identical to the fittings 120,220,320 of FIGS. 3 through 6, respectively, except that the fittings 420,520,620 are formed with a 90 degree elbow 440,540,640 rather than a 45 degree elbow 440,540,640. The 90 degree elbow 440,540,640 may be formed in any one of the three ways described above for the 45 degree fittings 120,220,320 with the tubular member 422,522,622 comprising a one, two or three-piece tubular member 442,522,622 as illustrated in FIGS. 8, 9 and 10, respectively.

Figure 13:
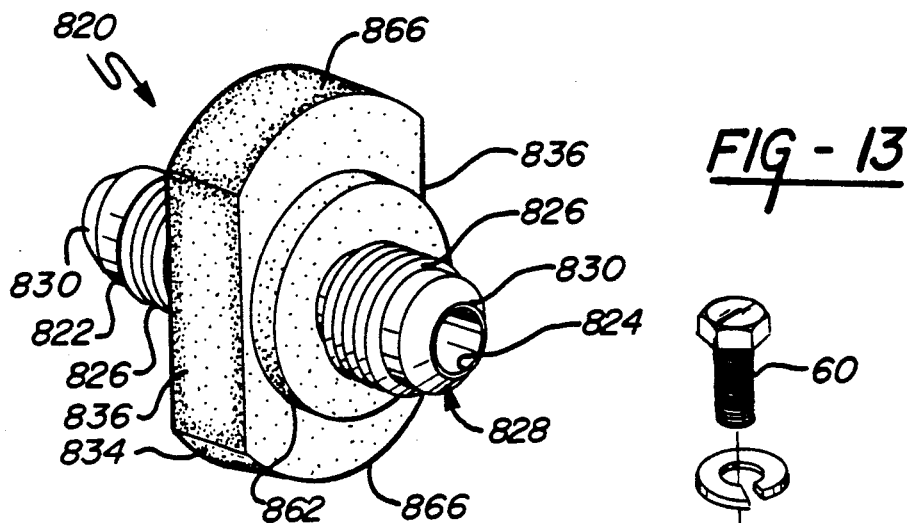
FIG. 13 is a perspective view of another embodiment of a fitting constructed in accordance with the present invention.

FIGS. 11 through 13 show two special types of fittings 720,820 adapted to be mounted within a standard plural line clamping system 52 well-known to the art. These fittings, 720,820 are similar to those described in FIGS. 1 through 10 above except that the fittings 720,820 include extra collar portions 762,862 for mounting the fittings within the clamping system 52, as will be described in more detail below.

Figure 14:
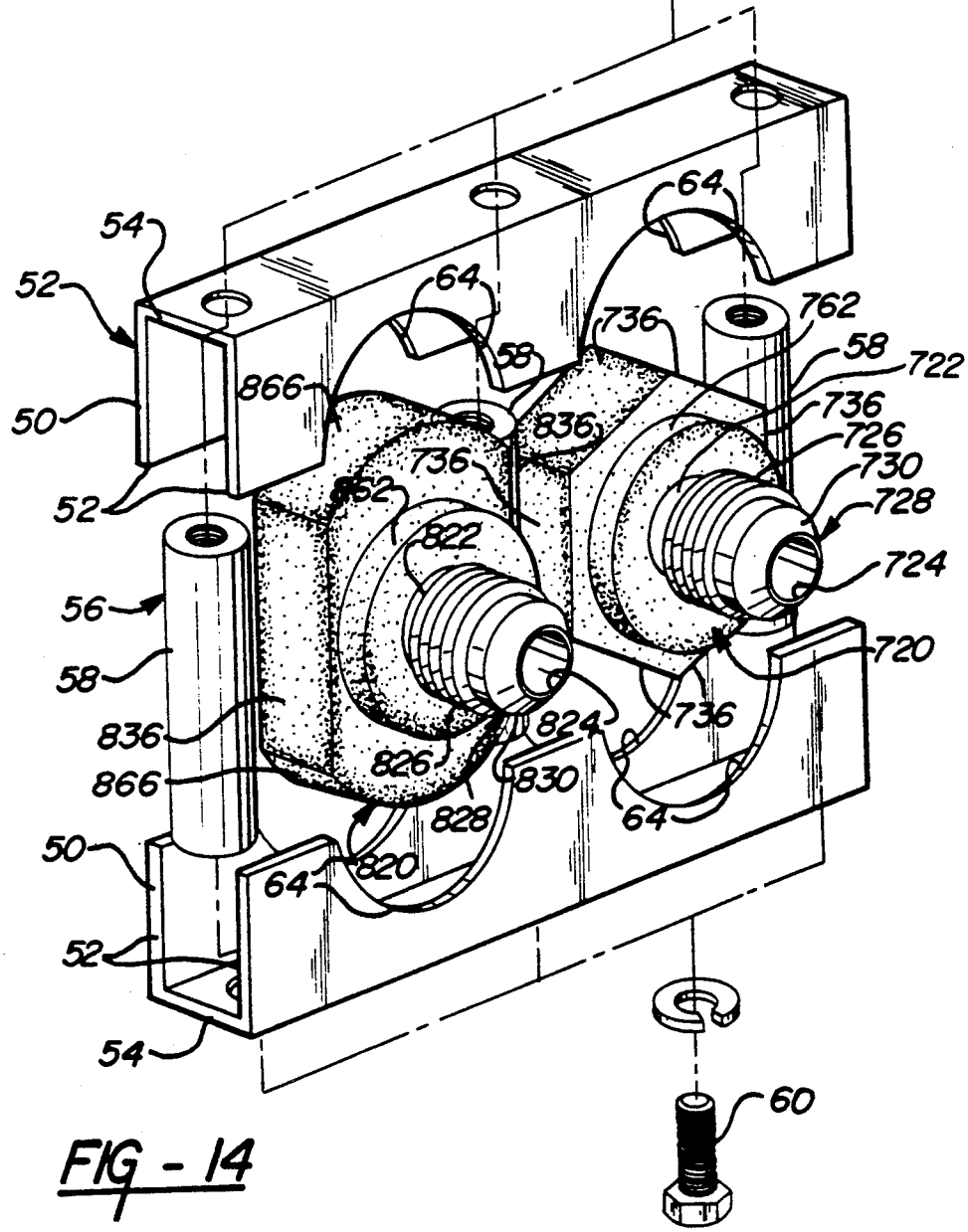
FIG. 14 is a perspective view of the fittings of FIGS. 11-13 shown as components of a standard plural line clamping system.

FIGS. 11 and 12 illustrate one of the two disclosed fittings 720 constructed in accordance with the present invention and adapted to be mounted within the standard plural line clamping system 52 shown in FIG. 14. This fitting 720 includes a one-piece tubular member 722 of round metal bar stock formed with a fluid passage 724 extending between opposite ends of the tubular member 722. The fitting 720 is provided with external male threaded portions 726 adjacent each end of the fitting 720 as the connection means 726 and further includes flared ends as the sealing means 728. The tubular member 722 also includes a knurled, external surface area 738 formed on the outer peripheral surface of the tubular member 722 intermediate the ends thereof as the mechanical bonding means 738.

Like the fitting 20 of FIGS. 1 through 2, the tubular member 722 is preferably formed from a single piece of round metal bar stock of a size large enough to form the threaded portions 726. Likewise, the fitting 720 includes a body member 734 formed radially larger than the tubular member 722 and disposed thereabout on the knurled surface 738 of the tubular member 722. The body member 734 can be made from the same materials described for the body members of FIGS. 1–10. The body member 734 is formed with a hexagonal cross section having three pairs of diametrically opposed tool engaging surfaces in the form of wrench flats 736.

The fitting 720 is adapted to be mounted between a pair of inverted U-shaped brackets 50 of the standard plural line clamping system 52, with each bracket 50 including a pair of spaced apart side walls 52 and a connecting wall 54 therebetween. The flats 736 of the body member 734 are adapted to engage a pair of adjacent fasteners 56 of the clamping system 52. The typical fasteners 56 for a standard plural line clamping system 52 include internally threaded barrels or spacers 58 disposed within and separating the U-shaped brackets 50. Bolts 60 are then screwed into the threaded barrels 58 to clamp the brackets 50 together. When clamped between the brackets 50, the flats 736 of the body member 734 are in abutting contact with the threaded barrels 58 which prevents rotation of the fitting 720 within the brackets 50.

The fitting 720 is further provided with two cylindrical collar portions 762 formed radially smaller than the body member 734 and disposed on opposite axial sides of the body member 734. The collar portions 762 are preferably formed integrally with the body member 734 out of the same material. The cylindrical collar portions 762 are adapted to be clamped between a pair of opposed semi-cylindrical clamping seats 64 formed on the outermost extent of the side walls 54 of the brackets 50 to securely mount the fitting 720 between the brackets 50.

FIG. 13 shows a fitting 820 which is identical to the fitting 720 of FIGS. 11 and 12 except that the body member 834 has a different shape. The body member 834 is generally rectangular in cross section with two sides of the rectangle forming a pair of diametrically opposed wrench flats 836 and the other two sides being generally rounded 866.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A fitting (120, 220,320,420,520,620) of the type for providing a fluid-tight connection between pressurized fluid conveying members, said fitting (120,220,320,420,520, 620) comprising:
   a tubular member (122,222,322,422,522, 622) having opposite distal ends and defining a fluid passage (124,224,324,424,524,624) extending between said ends;
   threaded connection means (126,226,326, 426,526,626) adjacent each end of said tubular member (126,226,326,426,526,626) for threadably connecting said fitting (120,220,320,420, 520,620) with associated pressurized fluid-conveying members;
   sealing means (128,228,328,428, 528,628) adjacent said connection means (126,226,326,426,526,628) for perfecting a fluid-tight seal between said fitting (120,220,320,420,520,620) and the associated pressurized fluid conveying members;
   a body member (134,234,334,434,534, 634) formed radially larger than said tubular member (122,222,322,422,522,622) and fixedly disposed thereabout to define tool engaging surfaces 136,236,336,436,536,636);
   and characterized by said tubular member 122,222,322,422,522,622) and said connection means (126,226,326,426,526,626) being fabricated from a first metal material and said body member (123,234,334,434,534,634) being formed from a second moldable material different from said first metal material, said tubular member defining an elbow between said ends independently of said body member.

2. A fitting (120,220,320,420, 520,620) as set forth in claim 1 further characterized by said second material comprising a rigid plastic material.

3. A fitting (120,420) as set forth in claim 2 further characterized by said tubular member (122,422) comprising a one-piece integral member fabricated from a single piece of round metal bar stock.

4. A fitting (120,420) as set forth in claim 3 further characterized by said tubular member (122,422) including mechanical bonding means (138,438) formed integrally on the outer surface of said tubular member (122,422) for mechanically bonding with said body member (134,434) upon molding the same about said tubular member (122,422).

5. A fitting (120,420) as set forth in claim 4 further characterized by said mechanical bonding means (138,438) comprising a knurled outer surface (138,438) of said tubular member (122,422).

6. A fitting (120,420) as set forth in claim 5 further characterized by said threaded connection means (126,426) comprising screw threads (122,422) adjacent said ends of said tubular member (122,422).

7. A fitting (120) as set forth in claim 6 further characterized by said elbow (140) comprising a 45 degree elbow (140).

8. A fitting (420) as set forth in claim 6 further characterized by said elbow (440) comprising a 90 degree elbow (440).

9. A fitting (220,520) as set forth in claim 2 further characterized by said tubular member (222,522) comprising a two-piece member having first (242,542) and second (244,544) leg sections joined directly to one another at adjacent ends thereof and defining an elbow (240,540) intermediate the ends of said tubular member (22, 522).

10. A fitting (220) as set forth in claim 9 further characterized by said elbow (240) comprising a 45 degree elbow (240).

11. A fitting (520) as set forth in claim 9 further characterized by said elbow (540) comprising a 90 degree elbow (540).

12. A method of making a fitting (120,220,320,420,520,620) of the type for providing a fluid-tight connection between pressurized fluid conveying members, said method comprising the steps of;
   forming a tubular member (122,222,322,422, 522,622) from a first metal material having opposite distal ends and forming a fluid passage (124,224,324,424,524,624) within the tubular member (122,222,322,422,522,622) extending between the ends thereof,
   forming integral threaded connection portions (126,226,326,426,526,626) of the same first metal material on the tubular member (122,222,322,422, 522,622) adjacent each end thereof for threaded connection with associated pressurized fluid-conveying members,
   forming sealing portions (128,228,328,428, 528,628) adjacent the connection portions for perfecting a fluid-tight seal between the fitting (120,220,320,420,520,620) and the associated pressurized fluid-conveying members.
   forming a body member (134,234,334,434,534, 634) radially larger than both the tubular member (122,222,322,422,522,622) and connection portions (126,226,326,426,526,626) of a second material different than the first metal material,
   forming an elbow (140,240,340,440,540,640) in the tubular member independently of the body member,
   and fixedly disposing the body member (134,234,334,434,534,634) about the tubular member (122,222,322,422,522,622).

13. A method as set forth in claim 12 further characterized by molding the body member (134,234,334, 434,534,634) about the tubular member (122, 222,322,422,522,622) from a rigid plastic material.

14. A method as set forth in claim 13 further characterized by forming a gripping surface (138,238,338,438,538,638) on the outer surface of the tubular member (122,222,322, 422,522,622) and then molding the body member (134,234,334,434,534,634) onto the gripping surface (138,238,338,438,538,638).

15. A method as set forth in claim 12 further characterized by forming the tubular member (122, 422) from a single continuous piece of round metal bar stock.

16. A method as set forth in claim 15 further characterized by bending the one-piece tubular member (122,422) to form the elbow (140,440).

17. A method as set forth in claim 16 further characterized by forming a 45 degree elbow (140).

18. A method as set forth in claim 16 further characterized by forming a 90 degree elbow (440).

19. A method as set forth in claim 15 further characterized by machining external screw threads (126,426) adjacent each end of the tubular member (122,422) as the connection portions (126,426).

20. A method as set forth in claim 14 further characterized by molding an O-ring seat (32) as the sealing portion (28) integrally with the body member (34) out of the same rigid plastic material.

21. A method as set forth in claim 14 further characterized by forming separate first (242,542) and second (244,544) leg sections of the tubular member (222,522) and joining adjacent ends of the leg sections (242,542;244,344) directly to one another.

22. A method as set forth in claim 21 further characterized by cutting the adjacent ends of the leg sections (242,244) at a 22.5 degree angle and thereafter joining them together and forming a 45 degree elbow (240).

23. A method as set forth in claim 21 further characterized by cutting the adjacent ends of the leg sections (542,544) at a 45 degree angle and thereafter joining them together and forming a 90 degree elbow (540).

24. A method as set forth in claim 14 further characterized by forming separate first (342,642) and second (344,644) leg sections of the tubular member (322,622) and a separate third elbow piece (346,646) and joining the leg sections (342,642;344,644) with the elbow piece (346,646).

25. A method as set forth in claim 24 further characterized by forming a 45 degree elbow (340) intermediate the ends of the fitting (320) with the elbow piece (346).

26. A method as set forth in claim 24 further characterized by forming a 90 degree elbow (640) intermediated the ends of the fitting (620) with the elbow piece (646).

27. A fitting (320,620) of the type for providing a fluid-tight connection between pressurized fluid conveying members, said fitting comprising:
  a tubular member (322,622) having opposite distal ends and defining a fluid passage (324,624) extending between said ends;
  threaded connection means (326,626) adjacent each end of said tubular member (322,622) for threadably connecting said fitting (320,620) with associated pressurized fluid-conveying members;
  sealing means (328,628) adjacent said connection means (326,626) for perfecting a fluid-tight seal between said fitting (320,620) and the associated pressurized fluid conveying members;
  a body member (334,634) formed radially larger than said tubular member (322,622) and fixedly disposed thereabout to define tool engaging surfaces;
  and characterized by said tubular member (322,622) and said connection means (326,626) being fabricated from a first metal material and said body member (334,634) being formed from a second moldable material different from said first metal material, said tubular member (322,622) comprising a three-piece member having first (342,642) and second (344,644) leg sections and a separate third elbow piece (346,646) interconnecting said leg sections (342,642;344,644).

28. A fitting (320) as set forth in claim 27 further characterized by said elbow piece (346) defining a 45 degree elbow (340) intermediate the ends of said tubular member (322).

29. A fitting (620) as set forth in claim 27 further characterized by said elbow piece (646) defining a 90 degree elbow (640) intermediate the ends of said tubular member (622).

30. A fitting (720,820) of the type for providing a fluid-tight connection between pressurized fluid conveying members, said fitting (720,820) comprising:
  a tubular member (722,822) having opposite distal ends and defining a fluid passage (724,824) extending between said ends;
  threaded connection means (726,826) adjacent each end of said tubular member (722,822) for threadably connecting said fitting (720,820) with associated pressurized fluid-conveying members;
  sealing means (728,828) adjacent said connection means (726,826) for perfecting a fluid-tight seal between said fitting (720,820) and the associated pressurized fluid conveying members;
  a body member (734,834) formed radially larger than said tubular member (722,822) and fixedly disposed thereabout to define tool engaging surfaces (736,836);
  and characterized by said tubular member (722,822) and said connections means (726,826) being fabricated from a first metal material and said body member (734,834) being formed from a second moldable material different from said first metal material, and including two cylindrical collar portions (762,862) formed radially smaller than said body member (734,834) and disposed on opposite axial sides of said body member (734,834), wherein said fitting (720,820) is adapted to be mounted between a pair of inverted U-shaped brackets (50) of a standard plural line clamping system (52) with each bracket including a pair of spaced apart side walls (52) and a connecting wall (54) therebetween and with said collar portions (762,862) adapted to be clamped between a pair of opposed semi-cylindrical clamping seats (64) formed on the outermost extend of the side walls(52) and with the flats (736,836) of the body member (734,834) adapted to engage a pair of adjacent fasteners (56) of the clamping system (52) extending between the connecting walls (54) of the brackets (50) for preventing rotation of the fitting (720,820) within the brackets (50).

31. A fitting (720,820) as set forth in claim 30 further characterized by said collar portions (762,862) and said body member (734,834) being integral and formed of the same second material.

32. A fitting (720, 820) as set forth in claim 31 further characterized by said tubular member (722,822) comprising an integral one-piece member formed of round metal bar stock.

33. A fitting (720,820) as set forth in claim 32 further characterized by said second material comprising a rigid plastic material.

34. A fitting (720,820) as set forth in claim 33 further characterized by said tubular member (722,822) including mechanical bonding means (738,838) formed integrally on the outer surface of said tubular member (722,822) for mechanically bonding with said body member (734,834) and said collar portions (762,862) upon molding the same about said tubular member (722,822).

35. A fitting (720,820) as set forth in claim 34 further characterized by said mechanical bonding means (738,838) formed on said tubular member (722,822).

36. A fitting (722,822) as set forth in claim 35 further characterized by said connection means (726,826) comprising screw threads (726,826) formed integrally on said tubular member (722,822).

37. A method of making a fitting (720,820) of the type for providing a fluid-tight connection between pressurized fluid conveying members, said method comprising the steps of:
forming a tubular member (722,822) from a first metal material having opposite distal ends and forming a fluid passage (724,824) within the tubular member (722,822) extending between the ends thereof,
forming integral threaded connection portions (726,826) of the same first metal material on the tubular member (722,822) adjacent each end thereof for threaded connection with associated pressurized fluid-conveying members,
forming a body member (734,834) radially larger than both the tubular member (722,822) and connection portions (726,826) of a second material different than the first metal material,
forming two cylindrical collar portions (762,862) radially smaller than the body member (734,834) on opposite axial sides of the body member (734,834) and out of the same material as used for the body member (734,834),
and fixedly disposing the body member (734,834) and collar portions (762,862) about the tubular member (722,822).

38. A method as set forth in claim 37 further characterized by molding the collar portion (762,862) onto the gripping surface (738,838) of the tubular member (732,822).

39. A method as set forth in claim 38 further characterized by forming the body member (734) with a hexagonal cross-section.

40. A method as set forth in claim 38 further characterized by forming the body member (834) with a generally rectangular cross section with two sides of the rectangle defining diametrically opposed wrench flats (836) and the other two sides being generally rounded (866).

41. A fitting (20) of the type for providing a fluid-tight connection between pressurized fluid conveying members, said fitting (20) comprising:
a tubular member (22) having opposite distal ends and defining a fluid passage (24) extending between said ends;
threaded connection means (26) adjacent each end of said tubular member (22) for threadably connecting said fitting (20) with associated pressurized fluid-conveying members;
sealing means (28) adjacent said connection means (26) for perfecting a fluid-tight seal between said fitting (20) and the associated pressurized fluid conveying members;
a body member (34) formed radially larger than said tubular member (22) and fixedly disposed thereabout to define tool engaging surfaces (36);
and characterized by said tubular member (22) and said connection means (26) being fabricated from a first metal material and said body member (34) being formed from a second moldable material different from said first metal material, said sealing means (28) comprising an O-ring seat (32) formed as an integral part of said body member (34).

* * * * *

UNITED STATES PATENT AND TRADEMARK OFFICE
CERTIFICATE OF CORRECTION

PATENT NO. : 5,215,335
DATED : June 1, 1993
INVENTOR(S) : Ronald J. Hamm, Jr.

It is certified that error appears in the above-indentified patent and that said Letters Patent is hereby corrected as shown below:

In the Abstract, delete material in brackets.

Column 6, line 54, delete "52" and insert --54-- therefor.

In the Claims:
Column 7, line 57, delete "123" and insert --134-- therefor.  Column 8, line 28, delete "22" and insert --222-- therefor.  Column 8, line 55, delete "." and insert --,-- therefor.  Column 9, line 32, delete "344" and insert --544-- therefor.  Column 9, line 52, delete "intermediated" and insert --intermediate-- therefor.  Column 10, line 58, delete "extend" and insert --extent-- therefor.  Column 11, line 18, delete "722,822" and --comprising a knurled outer surface (738,838)--.  Column 11, line 19, add claim 22 from the application.  Column 12, line 9, delete "732" and insert --722-- therefor.

Signed and Sealed this

Fifth Day of July, 1994

Attest:

BRUCE LEHMAN

*Attesting Officer*   *Commissioner of Patents and Trademarks*